Figure 1:
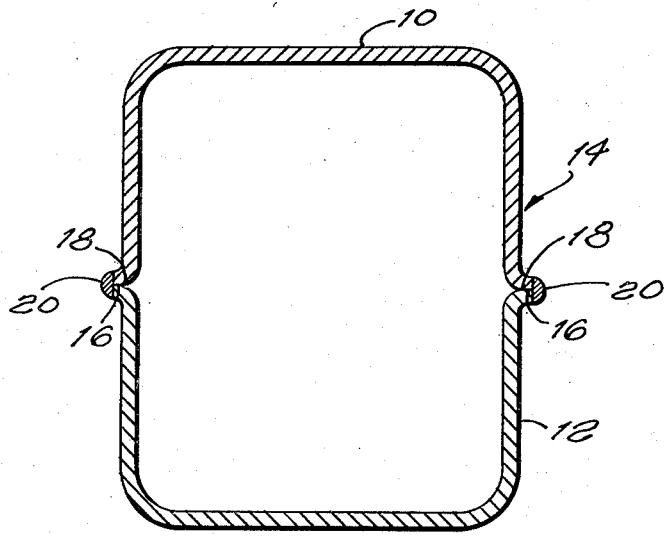

July 27, 1954     A. DANZIN ET AL     2,684,777

VACUUM-TIGHT JOINT FOR METAL, GLASS, OR LIKE MATERIAL PIECES

Filed May 14, 1947

INVENTORS:
ANDRE DANZIN,
EDOUARD DESPOIS AND
BY PIERRE PATRIARCHE

Patented July 27, 1954

2,684,777

UNITED STATES PATENT OFFICE 2,684,777

VACUUM-TIGHT JOINT FOR METAL, GLASS, OR LIKE MATERIAL PIECES

Andre Danzin, Edouard Despois, and Pierre Patriarche, Paris, France, assignors to Societe Francaise Radio Electrique, a corporation of France Application May 14, 1947, Serial No. 748,012

Section 1, Public Law 690, August 8, 1946
Patent expires December 11, 1965

11 Claims. (Cl. 220—2.1)

This invention relates to electron discharge tubes and other devices having evacuated envelopes and to vacuum-tight joints therefor.

In the construction of vacuum devices and in particular in the construction of tubes for use in radio, it is required to provide a vacuum tight envelope, either of insulating material or otherwise, which is traversed by a number of metallic conductors acting as current leads and which have to be carried from the envelope with good electrical insulation. In most cases the envelope is made in two parts which are united by an operation called closuring. Such constructions involve joints between conductors and insulators, or between insulators which must be vacuum tight.

In order to obtain best results from a vacuum tube it is desirable to choose for the conductors those metals which are most suitable electrically and for the insulators those glasses, ceramics or like materials which have the best dielectric qualities.

Hitherto, however, the necessity of obtaining vacuum tight joints has imposed certain requirements seriously limiting the choice of metals and insulators as well as the shapes in which they can be employed.

In present day usual practice vacuum tightness is ensured by glass-metal, glass-glass or glass-ceramic welds. Such welds present two important disadvantages: firstly it is necessary that the materials have closely similar coefficients of expansion and secondly the welds must be made at a high temperature which may cause chemical alterations to some of the internal parts of the tube. To some extent it is possible to avoid the necessity for closely similar coefficients of expansion by employing the metal in a shape such as will allow it easily to deform to take up for expansion but such welds are not easy to make or mechanically satisfactory.

There are other known forms of joint in which, in order to ensure tightness, use is made of organic varnish or of a coupling layer of grease without vapor pressure, or of an arrangement wherein rubber is compressed between two faces. Joints of this nature are, however, destroyed at about 300° C. the temperature which is necessarily reached during pumping and baking a tube.

An important object of the present invention is to provide a process whereby joints can be obtained without the foregoing defects and which will allow of the making of joints between any materials, without regard to their fusibility and expansion and without requiring the adoption of special shapes.

This object is achieved by forming a joint by contact between two optically polished surfaces, the contact being maintained by the external atmospheric pressure around the evacuated envelope. It has been found that the tightness of such a joint is maintained over a wide range of temperature whatever may be the expansion of the materials of which the parts in contact are made, because, when temperature variations occur the two surfaces glide hermetically over one another without destroying the quality of the contact. That is to say that it is possible to connect with such a joint two cylindrical bell jars of 30 mm. diameter, the one being in quartz glass with an expansion coefficient equal to $5.5 \times 10^{-7}$, the other being in crystal with an expansion coefficient of $90 \times 10^{-7}$.

There is thus obtained a joint which while not guaranteeing a perfect vacuum over a very long period, nevertheless permits the attainment of the utmost vacuum available from the best pumps during the temperature cycle required by pumping and baking. The invention is accordingly applicable to, though not limited to, the manufacture of continuously pumped tubes which can be dismantled.

So as to ensure the life of the joint and its complete tightness after manufacture of the tube, the invention also envisages the provision of a joint of another nature doubling the first.

This joint, which can be arranged in any suitable manner with respect to the first—in particular outside the first—need not be able to withstand the temperature of baking but only needs to be such as not be destroyed by the normal working temperature of the tube. If this temperature is below about 150° C. a covering layer of organic varnish can be used. For higher temperatures certain of the silicon varnishes are better. Finally, and especially in the construction of water-cooled power tubes, the optical contact joint may be doubled by a rubber joint of any known type.

Another feature of the invention resides in combining the jointing or closuring arrangements hereinbefore described with a simplified mounting arrangement of the electrodes of a vacuum tube and in constructing such a tube simply by alternately stacking metal and insulating elements, which may, if desired, be co-axial, with surfaces which have previously been optically polished, in contact.

The invention also envisages the simultaneous closuring and evacuation of a tube by pumping it out under a pneumatic jar, closuring being effected by bringing together the optically planar contact surfaces of the elements to be joined and then admitting air to the jar. This method of manufacture or assembly eliminates the need for the usual exhaust tube or pumping tail for the tube.

In the accompanying drawings Fig. 1 illustrates by way of example, in section on an axial plane, a form of tube in accordance with the invention.

Figure 2:
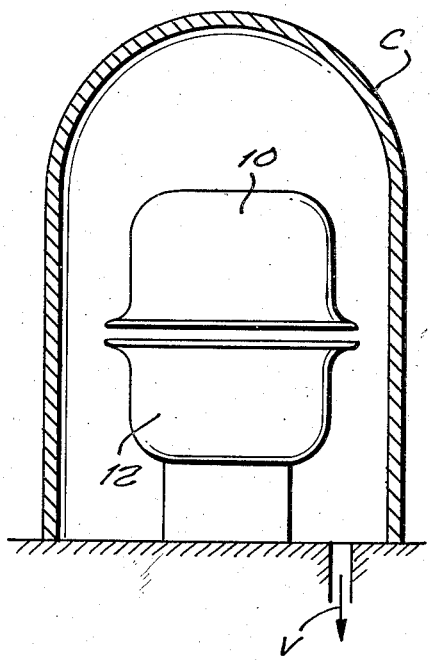
Figure 3:
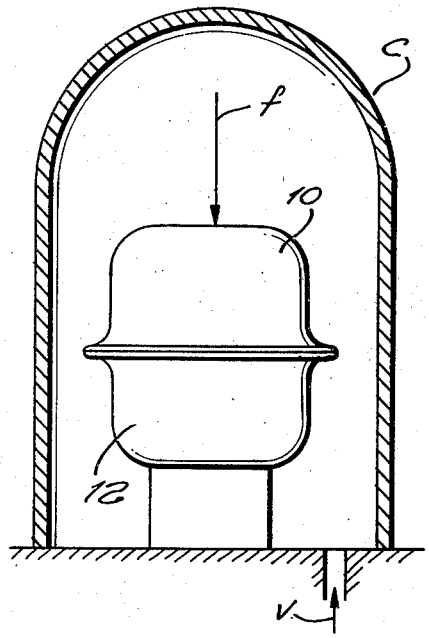

Figs. 2 and 3 of the accompanying drawings schematically illustrate the process by which closuring and evacuation of the tube of Fig. 1 by pumping it out under a pneumatic jar are simultaneously effectuated.

In Fig. 2 the constitutive pieces 10 and 12 of the envelope to be evacuated are arranged opposite one another at a short distance apart under the pneumatic jar C which is pumped out through the passage V. Thereafter the element 10 is applied to the element 12 by moving it in the direction of the arrow $f$ of Fig. 3 by any convenient means. Finally air is admitted to the jar C and in consequence the two elements 10 and 12 are pressed strongly together thus achieving closure as hereinbefore set forth. By doubling or backing a polished optical surface joint thus provided by a joint of another type (also as described hereinbefore) permanent vacuum tightness can be obtained.

The finished product is shown in Fig. 1 which illustrates the optically polished surface 16 of constitutive element 12 of the high-vacuum electron discharge tube in gliding hermetic contact with the optically polished surface 18 of the constitutive element 10 of the tube, the entire tube being designated by the numeral 14 of Fig. 1.

The above-mentioned additional seal for the joint between elements 10 and 12 is shown at 20, and, as was mentioned above, this additional seal 20 may be made of silicone, organic varnish, or rubber. The seal 20 firmly adheres to the constitutive pieces 10 and 12 of the envelope 14, and the seal provided by the material 20 is maintained in the event of gliding relative to each other of the hermetically contacting polished edge faces 16 and 18 of the constitutive pieces 12 and 10, respectively. As was mentioned above, the materials of the constitutive pieces 10 and 12 may be different from each other and may have different thermal expansions which will result in gliding of the surfaces 16 and 18 with respect to each other during a change in temperature.

What we claim is:

1. Method of manufacturing an air-tight envelope for a high-vacuum electron discharge tube composed of at least two constitutive pieces having substantially different thermal expansion coefficients comprising in combination, the steps of polishing to an optical degree the opposite edge faces of said constitutive pieces to be assembled; assembling the envelope by bringing into contact the thus polished opposite edge faces of said constitutive pieces; evacuating the thus assembled envelope to a high vacuum so that the contacting polished edge faces of said constitutive pieces are held by said vacuum pressed against each other in gliding hermetic contact without being fused to each other, thus maintaining after termination of the evacuation a vacuum within said assembled envelope despite different thermal expansion of said constitutive pieces; and applying to the external surface of the thus assembled envelope while said vacuum is maintained within the same, an additional sealing joint of an elastic material extending along and covering the region of the contacting polished edge faces of the constitutive pieces of said envelope, firmly adhering to each of said constitutive pieces so as to form an additional seal between said constitutive pieces which is also maintained in the event of gliding relative to each other of said contacting polished edge faces of the constitutive pieces due to different thermal expansion of the same.

2. In a high vacuum discharge tube, an airtight envelope composed of at least two constitutive pieces having substantially different thermal expansion coefficients and having contacting optically polished edge faces held by the vacuum within said envelope pressed against each other in gliding hermetic contact without being fused to each other; and an additional sealing joint of an elastic material applied to the external surface of the airtight envelope extending along and covering the region of the hermetically contacting polished edge faces of the constitutive pieces of the envelope, firmly adhering to each of said constitutive pieces so as to form an additional seal between said constitutive pieces which is also maintained in the event of gliding relative to each other of said hermetically contacting polished edge faces of the constitutive pieces due to different thermal expansion of the same.

3. An airtight envelope according to claim 2 in which said additional sealing joint consists of a silicone.

4. An airtight envelope according to claim 2 in which said additional sealing joint consists of an organic varnish.

5. An airtight envelope according to claim 2 in which said additional sealing joint consists of rubber.

6. Method of manufacturing an airtight envelope for a high vacuum electron discharge tube composed of at least two constitutive pieces comprising in combination, the steps of polishing to an optical degree the opposite edge faces of said constitutive pieces to be assembled; placing said constitutive pieces in a vessel with said polished opposite edge faces of said constitutive pieces spaced from each other; evacuating said vessel with said constitutive pieces located therein; assembling said envelope in said vessel by bringing said polished opposite edge faces of said constitutive pieces into contact with each other while located in said evacuated vessel; breaking the vacuum in said vessel while holding said polished opposite edge faces of said constitutive pieces in contact with each other, thereby maintaining after said breaking of the vacuum in said vessel a vacuum within said assembled envelope, said vacuum holding the contacting polished opposite edge faces of said constitutive pieces pressed against each other in gliding hermetic contact without being fused to each other; and applying to the external surface of said assembled envelope while said vacuum is maintained within the same, an additional joint of an elastic material extending along and covering the region of said hermetically contacting polished edge faces of said constitutive pieces of said envelope, firmly adhering to each of said constitutive pieces so as to form an additional seal between said constitutive pieces which is also maintained in the event of gliding relative to each other of said hermetically contacting polished edge faces of said constitutive pieces.

7. In a high vacuum discharge tube an airtight envelope composed of at least two constitutive pieces having contacting highly polished edge faces held by the vacuum within said envelope pressed against each other in gliding hermetic contact without being fused to each other; and an additional sealing joint of an elastic material applied to the external surface of the airtight envelope extending along and covering the region of the hermetically contacting polished edge faces of the constitutive pieces of the envelope, firmly adhering to each of said constitutive pieces so as to form an additional seal between said constitutive pieces which is also maintained in the event of gliding relative to each other of said hermetically contacting polished edge faces of the constitutive pieces during use of the tube.

8. An airtight envelope according to claim 7 in which said additional sealing joint consists of a silicone.

9. An airtight envelope according to claim 7 in which said additional sealing joint consists of an organic varnish.

10. An airtight envelope according to claim 7 in which said additional sealing joint consists of rubber.

11. Method of manufacturing an air-tight envelope for a high-vacuum electron discharge tube composed of at least two constitutive pieces comprising in combination, the steps of polishing to an optical degree the opposite edge faces of said constitutive pieces to be assembled; assembling the envelope by bringing into direct contact the thus polished opposite edge faces of said constitutive pieces; evacuating the thus assembled envelope to a high vacuum so that the contacting polished edge faces of said constitutive pieces are held by said vacuum pressed against each other in gliding hermetic contact without being fused to each other, thus maintaining after termination of the evacuation a vacuum within said assembled envelope; and applying to the external surface of the thus assembled envelope while said vacuum is maintained within the same, an additional sealing joint of an elastic material extending along and covering the region of the contacting polished edge faces of the constitutive pieces of said envelope, firmly adhering to each of said constitutive pieces so as to form an additional seal between said constitutive pieces which is also maintained in the event of gliding relative to each other of said contacting polished edge faces of the constitutive pieces.

References Cited in the file of this patent

UNITED STATES PATENTS

| Number | Name | Date |
|---|---|---|
| 1,079,804 | Sidon | Nov. 25, 1913 |
| 1,206,177 | Twyman et al. | Nov. 28, 1916 |
| 1,545,353 | Rosell et al. | July 7, 1925 |
| 1,562,533 | Weintraub | Nov. 24, 1925 |
| 1,992,556 | Tone | Feb. 26, 1935 |
| 2,229,436 | Beggs | Jan. 21, 1941 |
| 2,268,670 | Ronci | Jan. 6, 1942 |
| 2,286,239 | Sors | June 16, 1942 |
| 2,376,439 | Machlett | May 22, 1945 |
| 2,383,470 | Morgan | Aug. 28, 1945 |
| 2,504,504 | Despois | Apr. 18, 1950 |

OTHER REFERENCES

Black and Davis, "Elementary Practical Physics" (MacMillan Co., New York, 1938), page 114.